(12) United States Patent
Freeman

(10) Patent No.: US 9,503,793 B2
(45) Date of Patent: *Nov. 22, 2016

(54) SYSTEM AND METHOD FOR ENABLING CLIENT-SIDE INITIATED IDENTIFICATION OF MEDIA CONTENT

(71) Applicant: Disney Enterprises, Inc., Burbank, CA (US)

(72) Inventor: Eric Freeman, Bainbridge Island, WA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/743,761

(22) Filed: Jun. 18, 2015

(65) Prior Publication Data

US 2015/0289029 A1 Oct. 8, 2015

Related U.S. Application Data

(63) Continuation of application No. 12/806,922, filed on Aug. 23, 2010, now Pat. No. 9,106,973.

(51) Int. Cl.
| | |
|---|---|
| *G06F 15/16* | (2006.01) |
| *H04N 21/658* | (2011.01) |
| *H04L 29/06* | (2006.01) |
| *H04N 21/44* | (2011.01) |
| *H04N 21/4722* | (2011.01) |
| *H04N 21/8352* | (2011.01) |
| *H04N 21/81* | (2011.01) |

(52) U.S. Cl.
CPC ...... *H04N 21/6582* (2013.01); *H04L 63/0457* (2013.01); *H04L 65/4076* (2013.01); *H04L 65/608* (2013.01); *H04N 21/44008* (2013.01); *H04N 21/4722* (2013.01); *H04N 21/812* (2013.01); *H04N 21/8352* (2013.01)

(58) Field of Classification Search
CPC .................................................. H04L 63/0457
USPC ................................................. 709/217, 218
See application file for complete search history.

(56) References Cited

U.S. PATENT DOCUMENTS

| | | | |
|---|---|---|---|
| 6,947,935 B1 * | 9/2005 | Horvitz | ................ H04N 21/482 |
| 7,095,871 B2 * | 8/2006 | Jones | ................ G06F 17/30876 |
| | | | 382/100 |

* cited by examiner

*Primary Examiner* — Adnan Mirza
(74) *Attorney, Agent, or Firm* — Farjami & Farjami LLP

(57) ABSTRACT

There is provided a system and method enabling client-side initiated identification of media content rendered on a client-side media player. In one embodiment, the system comprises the client-side media player including a controller and a memory, a media content database accessible by the client-side media player over a network, and a media content identifier application to be run on the client-side media player. The media content identifier application, when executed by the client-side media player controller, performs a method comprising sampling the media content, sending a first data corresponding to the sample to the media content database over the network, and receiving a second data over the network identifying the media content, thereby enabling client-side initiated identification of the media content rendered on the client-side media player.

10 Claims, 3 Drawing Sheets

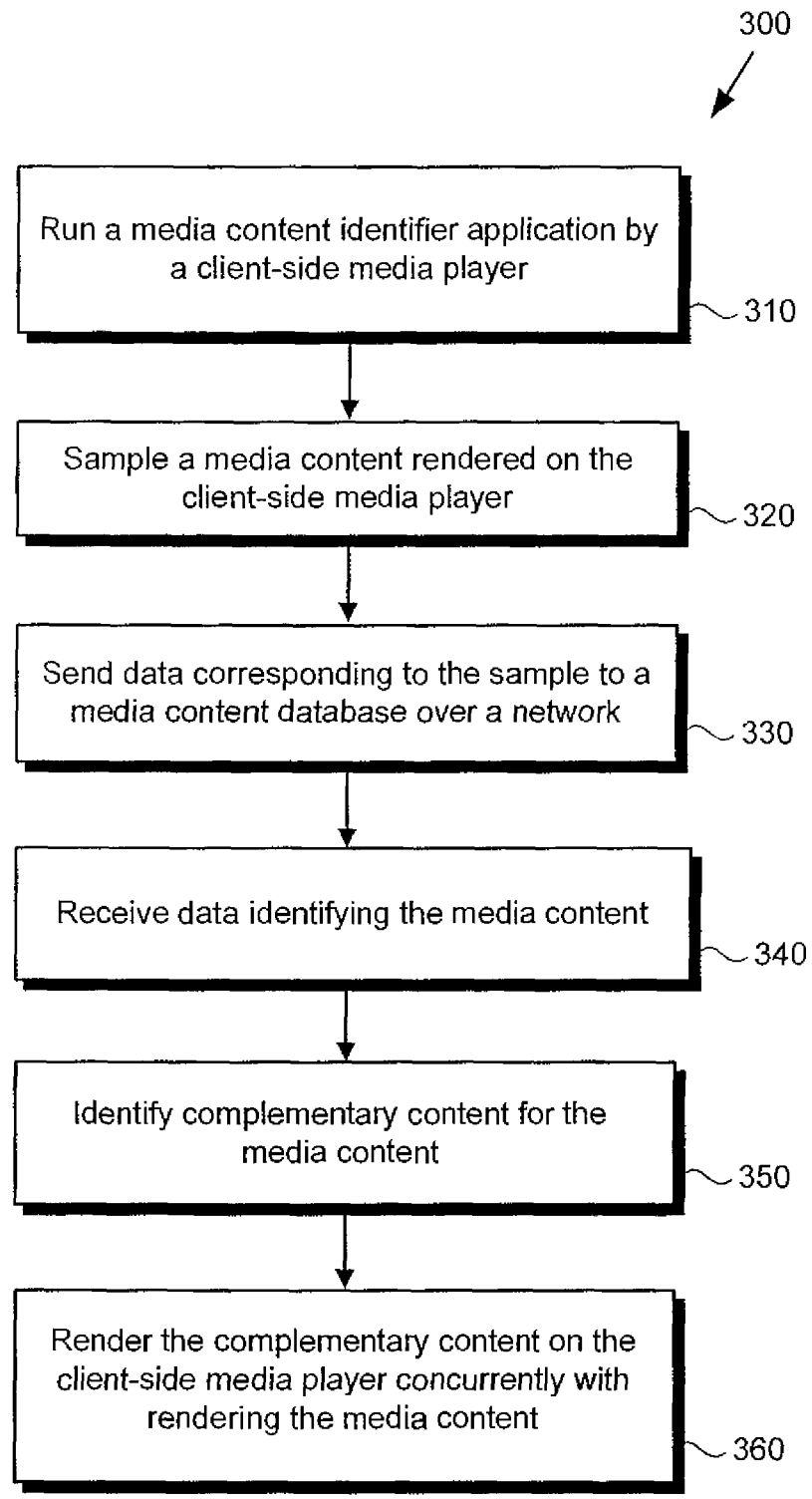

SYSTEM AND METHOD FOR ENABLING CLIENT-SIDE INITIATED IDENTIFICATION OF MEDIA CONTENT

This is a Continuation of U.S. patent application Ser. No. 12/806,922, filed Aug. 23, 2010, which is hereby incorporated by reference in its entirety.

BACKGROUND OF THE INVENTION

1. Field of the Invention

The present invention relates generally to the consumption of media content. More particularly, the present invention relates to systems and methods for identifying media content.

2. Background Art

The discretionary time that most of us are able to spend on leisure entertainment, such as the consumption of broadcast media content presented via our personal television sets, for example, seems to be in ever shorter supply. In addition, we are increasingly conditioned to having our attention occupied by more than one source of sensory stimulation at a time. For example, we now routinely conduct telephone conversations while we drive—using "hands free" communications systems, of course—manage email or text messaging using a mobile communication device while spectators to sporting events, and the list goes on. As our free time continues to diminish, and as our capacity and even desire for multiple concurrent stimulation sources grows, the satisfaction derived from a traditional broadcast media viewing experience may prove disappointing.

Nevertheless, when compared to more dynamic content generated more spontaneously, such as by being informally produced and streamed over the Internet, for example, broadcast media content that is expertly produced for commercial distribution carries with it the assurance of quality typically associated with a professional and highly polished product. As a result, we may prefer to consume such media content, be it information content such as news, instructional content, or entertainment content, due to our reasonable expectation that it has been artfully prepared.

One fairly recent conventional solution aimed at providing viewers of commercial broadcast media content with additional sources of stimulation packages additional content, or metadata informing delivery of additional content, with the primary media content selected for viewing by the consumer. For example, much of contemporary broadcast programming is displayed in conjunction with overlain commercial logos, promotions for additional programming, news feeds, and the like. Unfortunately for the viewer, however, that additional content is determined and provided according to information included with the primary media content by the broadcast provider. As a result, although broadcast programming is now more visually cluttered and potentially distracting than in the past, consumers remain largely unable to enjoy multi-tasking by concurrently experiencing more than one independent but related source of stimulation when viewing commercially distributed programming.

Accordingly, there is a need to overcome the drawbacks and deficiencies in the art by providing a solution enabling client-side initiated identification of media content rendered on a television or other media content player so as to allow consumers of that media content to receive relevant complementary content from sources other than the original media content provider.

SUMMARY OF THE INVENTION

There are provided systems and methods for enabling client-side initiated identification of media content, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 3 is a flowchart presenting a method of enabling client-side initiated identification of media content rendered on a client-side media player, according to one embodiment of the present invention.

DETAILED DESCRIPTION OF THE INVENTION

Figure 1:
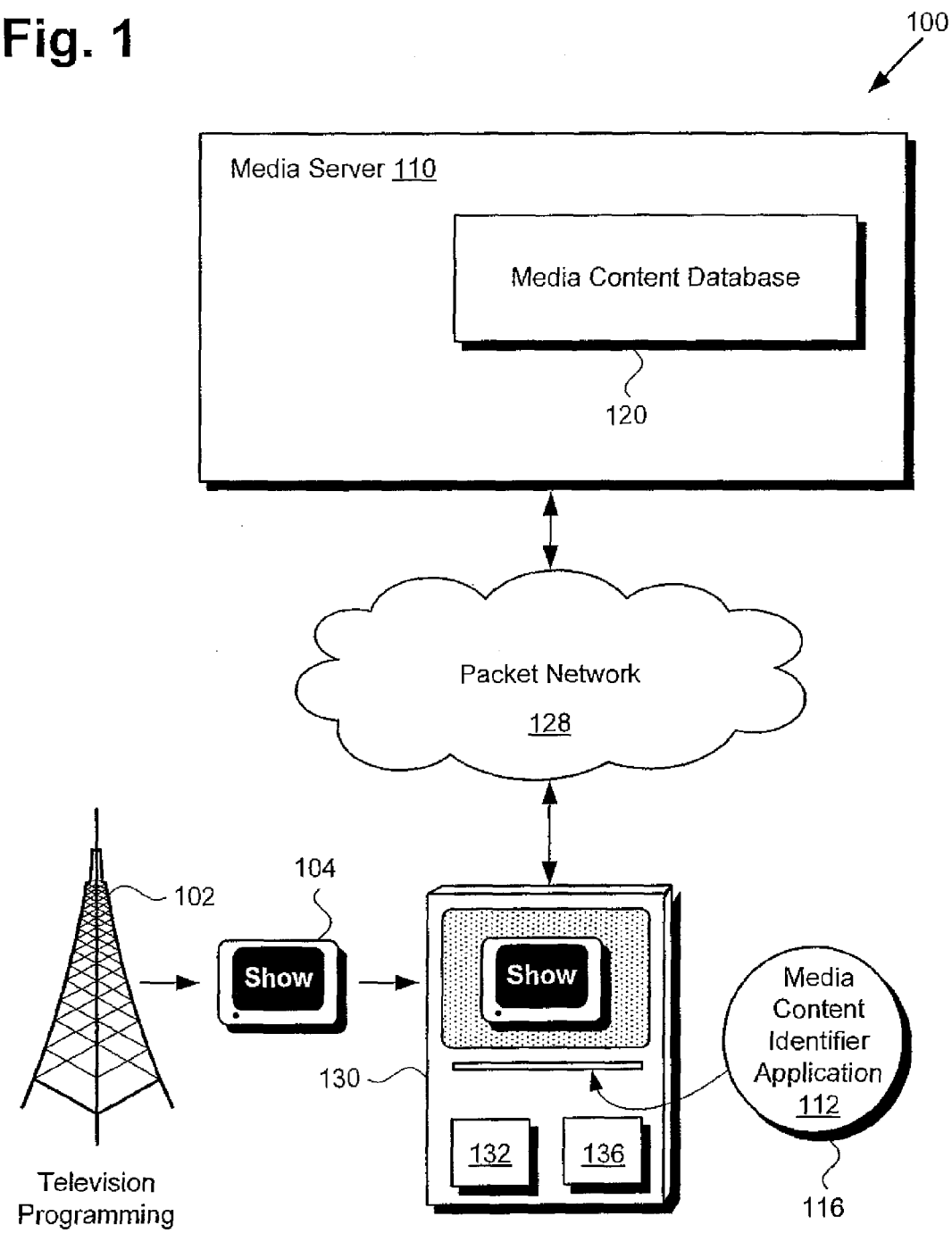
FIG. 1 shows a diagram of a system for enabling client-side initiated identification of media content rendered on a client-side media player, according to one embodiment of the present invention.

The present application is directed to a system and method for enabling client-side initiated identification of media content rendered on a client-side media player. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

FIG. 1 shows a diagram of a system for enabling client-side initiated identification of media content rendered on a client-side media player, according to one embodiment of the present invention. In the embodiment of FIG. 1, system 100 comprises media content database 120 residing on media server 110, and client-side media player 130, shown as a network connected television (TV) in the present embodiment. As shown in FIG. 1, client-side media player 130 includes controller 132 and memory 136, and is configured to receive media content identifier application 112 stored on computer-readable medium 116, which may take the form of an optical disc or universal serial bus (USB) storage device, for example, or any other computer-readable storage medium compatible with client-side media player 130. It is noted that once received, media content identifier application 112 can be stored in memory 136 and executed by controller 132 configured to read from either or both of memory 136 and computer-readable medium 116. Also shown in FIG. 1 are packet network 128 and provider 102 of media content 104 rendered on client-side media player 130.

According to the embodiment of FIG. 1, client-side media player 130 receives media content 104, such as broadcast network TV programming, from provider 102, represented as a commercial broadcasting network. Client-side media player 130 may receive media content 102 from a cable TV or satellite TV provider, for example, through a respective cable tuner or satellite set-top box (neither explicitly shown in FIG. 1). In addition, client-side media player 130 is configured to access media content database 120 over packet network 128, and to run media content identifier application 112.

Media content identifier application 112, under the control of controller 132, is configured to sample media content 104, for instance by storing a portion of media content 104 in a buffer provided by memory 136. For example, media content 104 may include audio content, such as a program soundtrack including dialogue, as well as video content, and media content identifier application 112 may be configured to sample a portion of the audio content only. In addition, media content identifier application 112 is configured to send data corresponding to the media content sample to media content database 120 over packet network 128, and to receive data over packet network 128 identifying media content 104.

For example, media content identifier application 112 may sample an audio portion of broadcast media content 104 from provider 102, and send data corresponding to the audio sample to media content database 120 on media server 110, over packet network 128, such as the Internet. Media server 110 may be configured to compare the data corresponding to the audio sample to database entries stored in media content database 120 to identify media content 104 from the sample. In such manner, client-side initiated identification of media content 104 is enabled by embodiments of the present invention.

Figure 2:
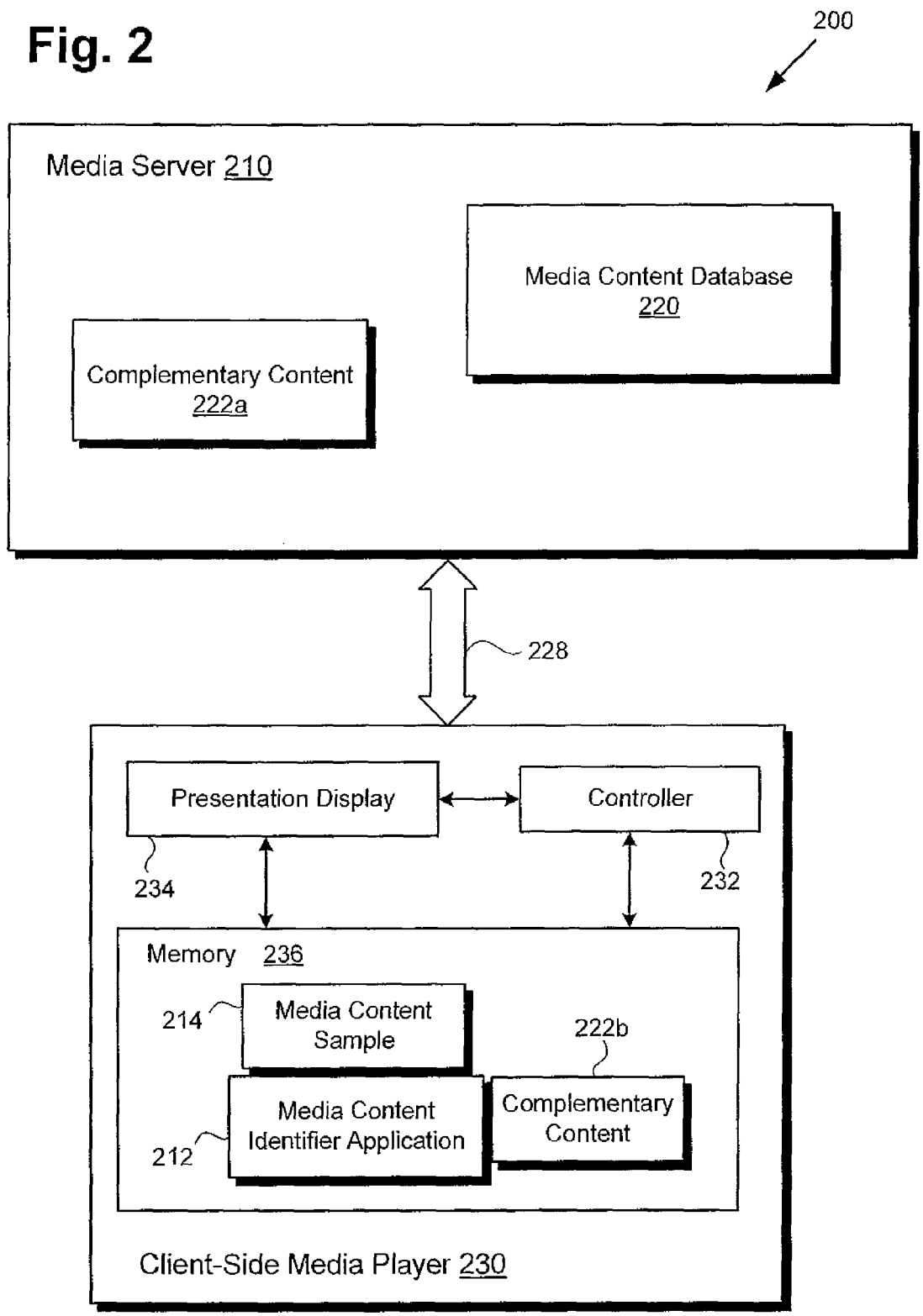
FIG. 2 shows a more detailed conceptual block diagram of a system for enabling client-side initiated identification of media content rendered on a client-side media player, according to one embodiment of the present invention.

The novel and inventive system of FIG. 1 will be further described by reference to FIG. 2, which provides a more detailed conceptual block diagram of a system for enabling client-side initiated identification of media content rendered on a client-side media player, according to one embodiment of the present invention. System 200, in FIG. 2, comprises client-side media player 230 in communication with media server 210 via network communication link 228. As may be seen from FIG. 2, media server 210 includes media content database 220, and complementary content 222a. Client-side media player 230 including controller 232 and memory 236 corresponds to client-side media player 130 including controller 132 and memory 136, in FIG. 1. As shown in FIG. 2, client-side media player 230 also comprises presentation display 234, which may be understood to correspond to the TV screen of client-side media player 130, in FIG. 1.

Controller 232 may be the central processing unit for client-side media player 230, for example, in which role controller 232 runs the media player firmware and/or operating system, mediates rendering of media content 104, shown in FIG. 1, on presentation display 234, and facilitates execution of media content identifier application 212. Presentation display 234, under the control of controller 232, may be utilized to render media content 104, as well as to concurrently render complementary content, such as complementary content 222a or 222b. Also shown in FIG. 2 is media content sample 214 stored in memory 236, such as in a continuous buffer having a predetermined capacity implemented in memory 236.

Media server 210 and media content database 220, in FIG. 2, correspond respectively to media server 110, and media content database 120, in FIG. 1. Complementary content 222a and 222b may comprise content relating to and supplementing media content 104, in FIG. 1, such as additional entertainment or advertising content targeted according to media content 104. Alternatively, complementary content 222a and/or 222b may include information about performers or characters depicted by media content 104, and/or client-side local information related to a theme of media content 104. Although the embodiment of FIG. 2 shows media content database 220 and complementary content 222a residing in common on media server 210, that representation is exemplary only, and in another embodiment, media content database 220 and complementary content 222a may be distributed over more than one server or storage medium.

According to the present embodiment, complementary content 222b is located in memory 236, having been received from media server 210 via network communication link 228. As previously explained, media content identifier application 212 can be configured to sample a media content rendered on client-side media player 230 and to send data corresponding to the sample, e.g., to media content sample 214, to media content database 220 for identification. As shown in FIG. 2, in one embodiment, media content identifier application 212, may be further configured to identify complementary content 222a/222b for media content 104. In some embodiments, as also shown in FIG. 2, complementary content 222b can be stored locally on memory 236. Alternatively, or in addition, in some embodiments media content identifier application 212 can be configured to obtain complementary content 222a and/or updates to complementary content 222b from a remote network storage resource, such as media server 210, for example.

When media content identifier application 212 identifies complementary content 222a/222b for media content 104, various filters and rules may be applied to enforce particular business rules and prevent the selection of inappropriate complementary content. For example, a particular broadcast channel may enter into exclusivity agreements with particular advertisers, for example to exclusively show only specific pre-approved content or advertisements on the particular broadcast channel. These agreements may, for example, enable advertisers to prevent competitor advertising on the same channel, or preserve brand name image by limiting the scope of advertising seen on a particular channel, for example to avoid unwanted association with other brands.

Such filters and rules may include content matching criteria, for example by allowing only specific advertisements to be shown with specific associated programming. This may, for example, enhance the ability of advertisers to target specific audience demographics more effectively. Still other rules may, for example, provide for conflict resolution or the avoidance of inappropriate complementary content selection. For example, if a program is an investigative news story concerning a specific brand, a rule may be employed to prevent any advertising from the same brand to be selected as complementary content during the program. Or, in another example, if the media content includes product placement of a specific brand in one category of goods, then the selection of any complementary content may avoid commercials from competitor brands in the same category of goods.

The operation of the present invention will now be further illustrated by reference to FIG. 3, which presents flowchart 300 describing a method of enabling client-side initiated identification of media content rendered on a client-side media player, according to one embodiment of the present invention. It is to be understood that certain details and features have been left out of flowchart 300 that are apparent to a person of ordinary skill in the art. While steps 310 through 360 in FIG. 3 are sufficient to describe a particular embodiment of the present method, other embodiments may utilize steps different from those shown in flowchart 300, or may include more, or fewer steps.

Referring first to step 310 of flowchart 300, step 310 comprises running a media content identifier application by a client-side media player. Step 310 may be performed by client-side media player 130, in FIG. 1, for example, using controller 132 to run media content identifier application 112. As described above, media content identifier application 112 can be run by client-side media player 130 from memory 136, or directly from computer-readable medium 116, on which media content identifier application 112 may be stored.

Continuing to step 320 in FIG. 3 and continuing to refer to FIG. 1, step 320 of flowchart 300 comprises sampling media content 104 rendered on client-side media player 130. For example, as has been described, media content 104 may comprise broadcast media content such as network television programming. Such media content typically includes audio content and video content, which together produce the soundtrack and visual imagery displayed by client-side media player, e.g., TV, 130. Referring now to FIG. 2, client-side media player 230 may be configured to provide a buffer for storing sampled content from media content 104, in FIG. 1. As shown in FIG. 2, step 320 can result in storage of media content sample 214 in memory 236, which may include such a buffer.

Step 320 may be performed according to instructions included in media content identifier application 212. In one embodiment, memory 236 may include a running buffer for temporary storage of a predetermined sample size taken from the media content rendered on client-side media player 230. Such a buffer may be time based, or frame based, for example. For instance, in one embodiment, media content identifier application 212 may be configured to sample a five second (5 s), or thirty second (30 s), or other time defined sample of the audio content contained by media content 104, while not sampling its video content. In other embodiments, media content identifier application 212 may sample only video content, or a combination of audio and video content for storage in memory 236 as media content sample 214.

The example method of flowchart 300 continues with step 330, which comprises sending data corresponding to media content sample 214 to media content database 220 over network communication link 228. Step 330 may be performed by client-side media player 230 according to instructions provided by media content identifier application 212. Data corresponding to media content sample 214 may comprise digital audio data, for example, and may be compressed or uncompressed.

Continuing with step 340 of flowchart 300, step 340 comprises receiving data identifying media content 104 over network communication link 228. According to the embodiment of FIG. 2, for example, identification of the media content is performed by media server 210 through comparison of the data corresponding to media content sample 214 with database entries in media content database 220. For example, according to one embodiment, media content database 220 may include a buffer including predetermined media content samples collected from substantially all contemporaneously broadcast media content available from provider 102, in FIG. 1. Where provider 102 is a cable television provider offering 1000 concurrently broadcasting channels, for instance, media content database 220 may include a corresponding number of running buffers holding a respective media content sample for each channel, as well as information about the media content being delivered on that channel, such as its title, episode number, theme, performers or characters depicted by the media content, advertising sponsors of the media content, and the like.

In other words, using media content database 220, media server 210 can be configured to identify media content 104 from media content sample 214. As a result, identification of media content 104 rendered on client-side media player 230 can be initiated by client-side media player 230, and be performed through use of media content database 220 without the participation of media content provider 102 apart from providing media content 104 itself. That is to say, media content 104 can be advantageously identified by its intrinsic content and need not carry additional identifying indicia, such as metadata, identification coding, visible marking such as bar-codes, and so forth.

Moving now to step 350 of flowchart 300 and referring once again to FIG. 2, step 350 comprises identifying complementary content for the media content rendered on client-side media player 230. Once again, step 350 can be performed by media content identifier application 212, and may correspond to identification of locally stored complementary content 222b residing in memory 236, or remotely stored complementary content 222a and/or updates to complementary content 222b accessible through network communication link 228. Network communication link 228 may correspond to an Internet connection, for example.

As previously described, in one embodiment, complementary content 222a and 222b can include advertising content targeted to media content 104, information about media content 104, local or regional information related to a theme of media content 104, or even interactive puzzles, polls, or games related to a theme of media content 104. Media content identifier application 212 can be configured to select all available complementary content for rendering on client-side media player. 230, or it may be configured to select from among the complementary content identified in step 350. Where numerous items of complementary content are available, media content identifier application 212 may be configured to identify a maximum number of complementary content items for concurrent display, such as one, two, or three items of complementary content, for example.

As a specific example, where media content 104 is nationally syndicated programming devoted to a history of tornado activity in the United States, media content identifier application 212 enables client-side initiated identification of media content 104 as weather related programming with a specific emphasis on tornados. Media content identifier application 212 may further identify complementary content, such as prevailing local weather conditions, an interactive quiz regarding tornados, and/or a local or regional history of significant weather events. Depending on the configuration of media content identifier application 212, media content identifier application 212 may select some or all of that complementary content for rendering, by client-side media player 230. Alternatively, in some embodiments, media content identifier application 212 can be configured to publish a list of identified complementary content on presentation display 234 of client-side media player 230, and prompt a user to select desired complementary content for viewing.

Step 360 of flowchart 300 then comprises rendering the complementary content on client-side media player 230 concurrently with rendering media content 104. Step 360 can be performed cooperatively by client-side media player 230 and media content identifier application 212, for example. In one embodiment, the complementary content identified by media content identifier application 212 in step 350 can be used to populate one or more viewing panes and/or interactive "widgets" rendered by client-side media player 230. According to the present embodiment, those viewing panes and/or widgets containing complementary content are rendered concurrently with rendering of media content 104 on presentation display 234, thereby providing a viewer with multiple independent but thematically relates sources of stimulation with which to interact.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A media server for enabling client-side initiated identification of a media content rendered on a client-side media player capable of communication with the media server over a network, the media server comprising:
  a media content database;
  a processor configured to:
    receive, over the network from the client-side media player, a continuous portion of at least one of an audio content and a video content of the media content being rendered on the client-side media player;
    identify the media content, using the media content database, based on the at least one of the audio content and the video content of the continuous portion of the media content;
    generate identification data in response to identifying the media content; and
    transmit the identification data from the media server over the network to the client-side media player for identifying the media content in response to receiving the continuous portion of the at least one of the audio content and the video content from the client-side media player.

2. The media server of claim 1, wherein the media content comprises broadcast media content.

3. The media server of claim 1, wherein the network comprises the Internet.

4. The media server of claim 1, wherein the identification data is utilized to identify complementary content for the media content.

5. The media server of claim 4, wherein the complementary content is one of advertising content targeted according to the media content, information about performers depicted by the media content, information about characters depicted by the media content, and client-side local information related to a theme of the media content.

6. A method for use by a media server for enabling client-side initiated identification of a media content rendered on a client-side media player capable of communication with the media server over a network, the media server having a processor and a media content database, the method comprising:
  receiving, using the processor and over the network from the client-side media player, a continuous portion of at least one of an audio content and a video content of the media content being rendered on the client-side media player;
  identifying the media content, using the media content database, based on the at least one of the audio content and the video content of the continuous portion of the media content;
  generating, using the processor, identification data in response to identifying the media content; and
  transmitting, using the processor, the identification data from the media server over the network to the client-side media player for identifying the media content in response to receiving the continuous portion of the at least one of the audio content and the video content from the client-side media player.

7. The method of claim 6, wherein the media content comprises broadcast media content.

8. The method of claim 6, wherein the network comprises the Internet.

9. The method of claim 6, wherein the identification data is utilized to identify complementary content for the media content.

10. The method of claim 9, wherein the complementary content is one of advertising content targeted according to the media content, information about performers depicted by the media content, information about characters depicted by the media content, and client-side local information related to a theme of the media content.

* * * * *